United States Patent
Jun et al.

(10) Patent No.: US 7,340,234 B2
(45) Date of Patent: Mar. 4, 2008

(54) UWB TRANSMITTING AND RECEIVING DEVICE FOR REMOVING AN UNNECESSARY CARRIER COMPONENT IN A TRANSMISSION SIGNAL SPECTRUM

(75) Inventors: Si-Bum Jun, Seoul (KR); Tae-Hui Cho, Gunpo-si (KR); Sun-Gi Lee, Seoul (KR); Kook-Jun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 402 days.

(21) Appl. No.: 11/020,354

(22) Filed: Dec. 23, 2004

(65) Prior Publication Data

US 2005/0136868 A1 Jun. 23, 2005

(30) Foreign Application Priority Data

Dec. 23, 2003 (KR) ...................... 10-2003-0095126

(51) Int. Cl.
*H04B 1/06* (2006.01)
*H04B 1/04* (2006.01)
*H04L 25/10* (2006.01)

(52) U.S. Cl. ............................... 455/232.1; 455/127.1; 455/126; 455/67.11; 455/226.1; 375/319; 375/150; 375/324; 375/295

(58) Field of Classification Search ............. 455/127.1, 455/232.1, 78, 126, 67.11, 67.13, 67.14, 63.1, 455/226.1, 296; 375/319

See application file for complete search history.

(56) References Cited

U.S. PATENT DOCUMENTS

| 5,519,887 | A  | * | 5/1996 | Lieu ............................ 455/266 |
| 6,255,986 | B1 | * | 7/2001 | Alberty et al. .............. 342/174 |
| 6,498,929 | B1 | * | 12/2002 | Tsurumi et al. ............. 455/296 |
| 6,707,860 | B1 | * | 3/2004 | Sevenhans ................... 375/319 |
| 6,816,712 | B2 | * | 11/2004 | Otaka et al. .................. 455/83 |
| 6,937,646 | B1 | * | 8/2005 | McCorkle .................... 375/150 |
| 2004/0071118 | A1 | * | 4/2004 | Dabak et al. ................ 370/335 |

\* cited by examiner

*Primary Examiner*—Lana Le
*Assistant Examiner*—Muhammad Akbar
(74) *Attorney, Agent, or Firm*—The Farrell Law Firm, P.C.

(57) ABSTRACT

An Ultra Wide Band (UWB) transmitting and receiving device that includes a Digital Signal Processor (DSP) for implementing a DC offset cancellation algorithm, an adder for adding a baseband transmission signal from the transmitter and a calibration signal produced by the algorithm of the DSP, a modulator for modulating the signal from the adder, a transmitter amplifier for amplifying the modulated signal, a coupler for applying the output of the transmitter to the receiver, and a switch for selectively connecting the output of the coupler to the input of the receiver.

3 Claims, 2 Drawing Sheets

UWB TRANSMITTING AND RECEIVING DEVICE FOR REMOVING AN UNNECESSARY CARRIER COMPONENT IN A TRANSMISSION SIGNAL SPECTRUM

PRIORITY

This application claims priority to an application entitled "UWB TRANSMITTING/RECEIVING DEVICE FOR REMOVING UNNECESSARY CARRIER COMPONENT IN TRANSMISSION SIGNAL SPECTRUM", filed in the Korean Intellectual Property Office on Dec. 23, 2003 and assigned Serial No. 2003-0095126, the contents of which are incorporated herein by reference.

BACKGROUND OF THE INVENTION

1. Field of the Invention

The present invention relates generally to an Ultra Wide Band (UWB) wireless transmission technique, and more particularly to a UWB transmitting and receiving device for removing an unnecessary carrier component in its transmission signal spectrum, which is an expected requirement for implementing the UWB transmitting and receiving device.

2. Description of the Related Art

Standards currently proposed in the UWB standardization use a band pass type signal spectrum, which is different from the conventional impulse radio UWB transmitting/receiving device, in order to meet spectrum emission mask requirements proposed by the US Federal Communications Commission (FCC). Accordingly, the configuration of the UWB transmitting and receiving device is expected to differ slightly from that of the conventional heterodyne or homodyne type. By considering a bandwidth of at least 500 MHz as a characteristic of UWB signals, it is expected that the homodyne type, rather than the heterodyne type, will be dominant as a practically applicable implementation type.

When the conventional homodyne transmitting and receiving technique is applied directly to the UWB system, a certain amount of carrier frequency components, which are unrelated to signals originally intended to be transmitted, are leaked into the signal spectrum of the transmitter of the UWB transmitting and receiving device. The carrier frequency leakage is caused by limited physical characteristics of a modulator in the UWB transmitting and receiving device, and it is practically impossible to reduce the carrier frequency leakage to zero.

Generally, isolation between RF (radio frequency) and LO (local frequency) ports of a modulator used in the homodyne transmitter is in the range of 20 to 40 dBc with respect to driving power of the local frequency port. More specifically, 40 dBc can be considered the upper limit achievable by the current technology.

It is prescribed by the U.S. FCC that carrier frequency leakage of the UWB transmitting and receiving device be maintained at −41.5 dBm/MHz or less in bands from 3.1 to 10.6 GHz. Actual driving power of the local frequency port of the modulator achievable by the current technology is in the range of −5 to 0 dBm. When it is assumed that isolation between the LO and RF ports is at the best condition (i.e., 40 dBc), the carrier frequency leakage in the transmitter is in the range of −45 to −40 dBm, which violates the FCC regulations.

It is known in the art that the carrier frequency leakage must be maintained at −20 dBc or less with respect to the signal power to maintain a Signal-to-Noise Ratio (SNR), which can be demodulated in the receiver. Taking this into account, it is required that the isolation in the transmitter be at least 60 dBc, but it is practically impossible to achieve this value solely by the RF circuit design technology.

SUMMARY OF THE INVENTION

Therefore, the present invention has been designed in view of the above and other problems, and it is an object of the present invention to provide a UWB transmitting and receiving device for removing an unnecessary carrier component in its transmission signal spectrum, wherein a required isolation level between LO and RF ports is achieved by adaptively controlling the unnecessary carrier component of the transmission signal using a Digital Signal Processing (DSP) algorithm in a modulator.

In accordance with the present invention, the above and other objects can be accomplished by an Ultra Wide Band (UWB) transmitting and receiving device including a receiver and a transmitter. The device includes a Digital Signal Processing (DSP) device for implementing a DC offset cancellation algorithm; an adder for adding a baseband transmission signal from the transmitter and a calibration signal produced by the algorithm of the DSP device; a modulator for modulating a signal from the adder; a transmitter amplifier for amplifying the modulated signal; a coupler for applying an output of the transmitter to the receiver; and a switch for selectively connecting an output of the coupler to an input of the receiver.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may obscure the subject matter of the present invention.

Figure 1:
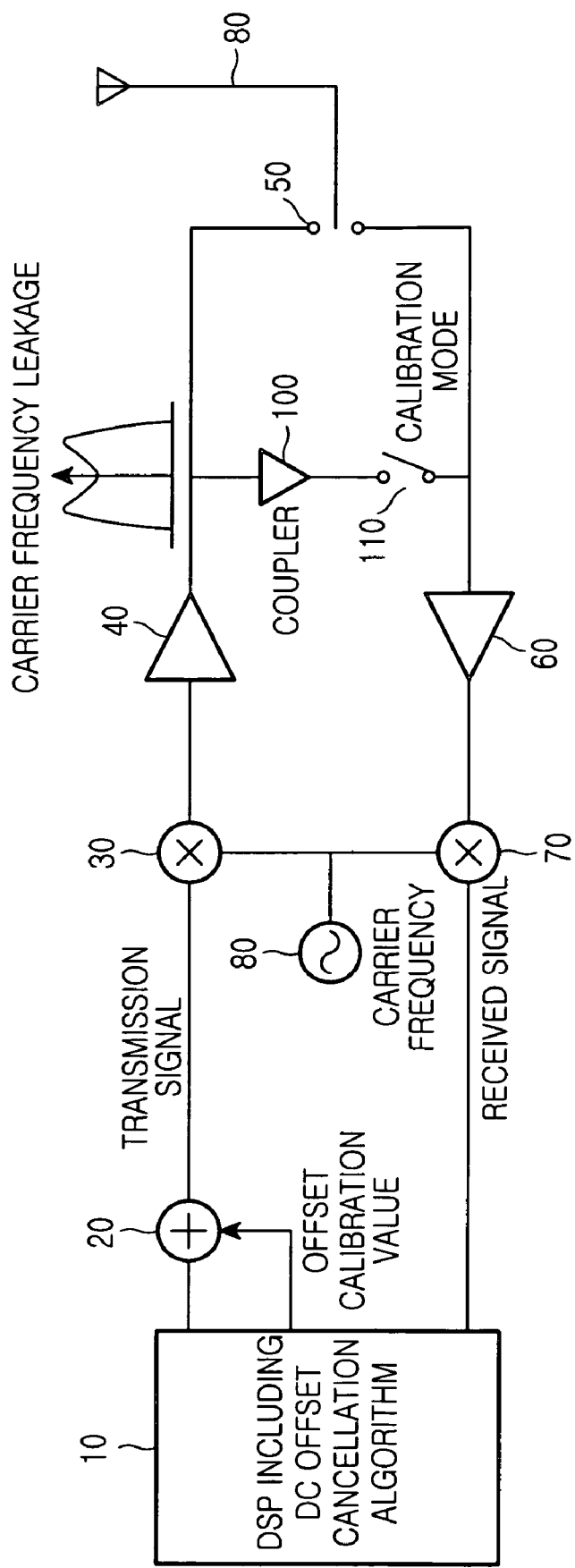
FIG. 1 is a diagram illustrating a UWB transmitting and receiving device according to a first embodiment of the present invention.

FIG. 1 is a diagram illustrating a UWB transmitting and receiving device according to a first embodiment of the present invention. As illustrated in FIG. 1, the UWB transmitting and receiving device includes an antenna switch 50 for selectively using an antenna 80 in transmission and reception modes. The UWB transmitting and receiving device also includes a Digital Signal Processing (DSP) device 10 for implementing a DC offset cancellation algorithm, an adder 20 for adding a baseband signal from a transmitter and a calibration signal generated by the algorithm of the DSP device 10, a modulator 30 for modulating a signal from the adder 20, a transmitter amplifier 40 for amplifying the modulated signal, a coupler 100 for applying the output of the transmitter to a receiver, and a switch 110 for selectively connecting the output of the coupler 100 to the input of the receiver. The UWB transmitting and receiving device further includes a receiver amplifier 60 and a modulator 70 that operates as a correlator.

The transmitter and receiver of the UWB system according to the present invention use the same frequency spectrum mask. That is, the transmitter and receiver of the UWB system use the same carrier frequency. However, the transmitter and receiver of the UWB system do not operate at the same time because they operate in Time Division Duplexing (TDD) mode. Therefore, the receiver is generally in idle mode when the transmitter is in operation. Because the receiver is homodyne, it is assumed that the DSP device 10 has a DC offset cancellation algorithm implemented for the receiver.

The present invention is characterized in that at least a part of a signal passing through the transmitter is applied to the receiver in idle state when the transmitter is in operation, in order to estimate a carrier feed-through component of the transmitter using a DC offset cancellation algorithm of the receiver and reflect the estimated value in the baseband signal of the transmitter.

The operation of the UWB transmitting and receiving device according to the present invention will now be described herein below in two modes, i.e., one in which the device is transmitting signals and the other in which the device is not transmitting signals.

When the device is transmitting signals, in a normal transmitting state, the UWB transmitting and receiving device samples a portion of a signal being transmitted to the antenna 80, and applies the sampled signal to the receiver in idle mode, and then processes the sampled signal in the same manner as normally received signals to estimate a carrier component included in the sample signal. Here, it is assumed that the receiver is in a normal receiving state after exiting the idle mode.

More specifically, when the UWB transmitting and receiving device is transmitting signals, a part of a transmission signal being transmitted to the antenna 80 is applied to the receiver via the coupler 100. The switch 100 is closed in order for the output of the coupler 100 to be input to the receiver amplifier 60, in response to a control signal from a controller (not shown). The transmission signal input to the receiver amplifier 60 is then input to the DSP device 10 via the modulator 70. Using the signal received from the modulator 70, the DSP device 10 estimates a DC offset caused by the transmitter. The carrier component of the transmission signal is converted to a corresponding DC offset by passing through the receiver, after passing through the coupler 100, such that the carrier component can be estimated using the DC offset cancellation algorithm of the conventional homodyne receiver. Because the DSP device 10 includes the original form of the signal sampled in the transmitter, the DSP device 10 can regard the value estimated using the DC offset cancellation algorithm of the receiver as an error caused by incompleteness of the transmitter. It is assumed that the DSP device 10 has previously calculated and stored a DC offset caused by the receiver, which will be described in more detail later.

Based on the estimated value, the DSP device 10 generates a calibration signal at a specific level for the baseband signal of the transmitter, and outputs the generated calibration signal to the adder 20. The adder 20 adds the calibration signal to the baseband transmission signal in order to adaptively control a carrier feed-through component of the signal being transmitted.

However, when the transmitter is not transmitting signals, the UWB transmitting and receiving device is in a self calibration mode, instead of normal mode. In the self calibration mode, the transmitter generates and applies a preset signal to the receiver without transmitting it through the antenna 80.

Next, the DC offset calibration of the receiver is performed. The firstly estimated DC offset value includes a DC offset caused by the transmitter, and also a DC offset caused by the receiver, both of which cannot be identified at the same time. Accordingly, the static DC offset caused by the receiver has been previously estimated and stored in the DSP device 10.

When estimating the carrier feed-through component of the transmitter, the deterministic DC offset of the receiver previously stored in the DSP device 10 is removed from the firstly estimated DC offset value to correctly estimate the DC offset caused by the transmitter. The deterministic DC offset indicates that the DC offset of the receiver can be deterministically determined because the input signal of the receiver during the estimation of the carrier feed-through component is not random but instead the original form of the input signal is already known, differently from when the receiver is in the normal receiving state.

Figure 2:
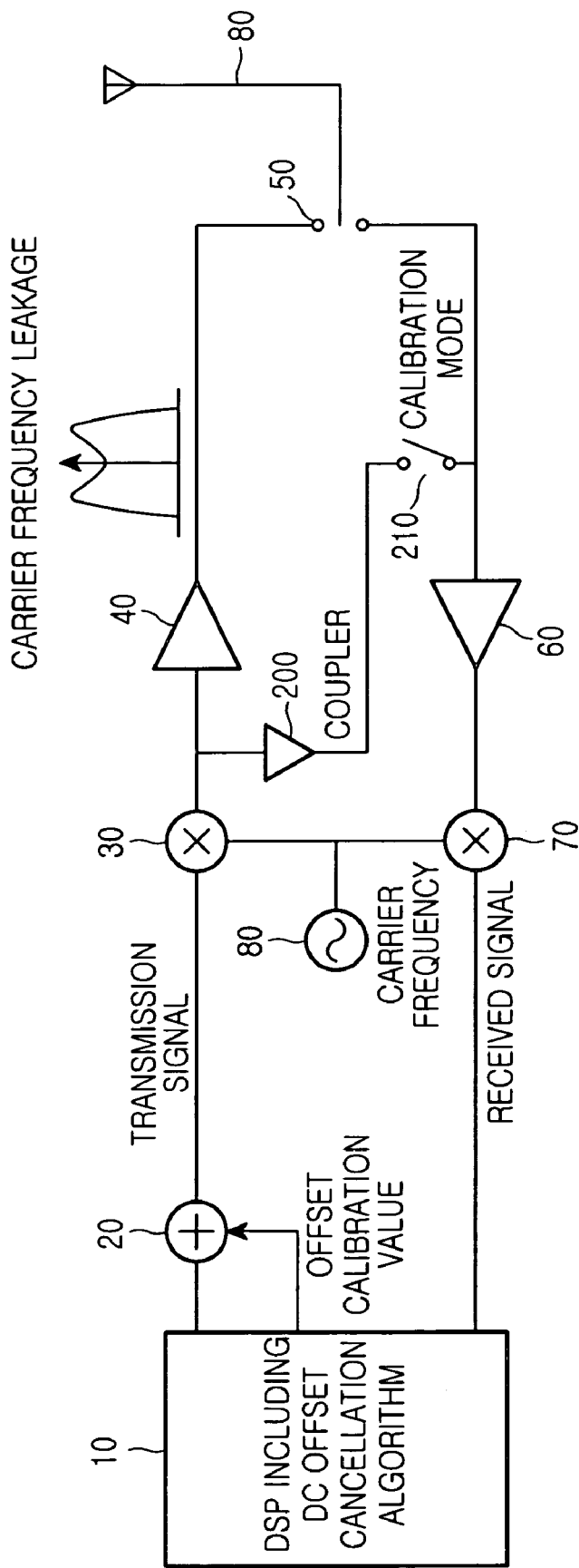
FIG. 2 is a drawing illustrating a UWB transmitting and receiving device according to a second embodiment of the present invention.

FIG. 2 illustrates a UWB transmitting and receiving device according to a second embodiment of the present invention. The UWB transmitting and receiving device according to the second embodiment differs from that of the first embodiment in that the output of a modulator 30, instead of the output of a transmitter amplifier 40, is connected to the input of a receiver amplifier 60. Accordingly, a coupler 200 for connecting the output of the transmitter to the input of the receiver is connected between the output of a modulator 30 and a switch 210. When the switch 210 is closed, the output of the transmitter amplifier 30 is input to the receiver. The construction and operation of the other elements is the same as in the first embodiment. Therefore, a detailed description of the construction and operation of the other elements will not be given again.

As described above, according to the present invention, at least a part of a signal passing through the transmitter is applied to the receiver in idle state when the transmitter is in operation, in order to estimate a carrier feed-through component of the transmitter using a DC offset cancellation algorithm of the receiver and reflect the estimated value in the baseband signal of the transmitter.

The UWB transmitting and receiving device according to the present invention uses the receiver not in use when the transmitter is transmitting signals to estimate a carrier feed-through component of the transmitter, and removes a previously stored deterministic DC offset of the receiver from the firstly estimated DC offset value to correctly estimate a DC offset caused by the transmitter.

While the embodiments of the present invention have been described as being applied to the UWB transmitting and receiving device using a single band, it should be noted that the present invention can also be applied to a UWB transmitting and receiving device using a plurality of bands.

Although the preferred embodiments of the present invention have been disclosed for illustrative purposes, those skilled in the art will appreciate that various modifications, additions, and substitutions are possible, without departing from the scope and spirit of the present invention as disclosed in the accompanying claims.

What is claimed is:

1. An Ultra Wide Band (UWB) transmitting and receiving device including a receiver and a transmitter, the device comprising:
   a coupler connected to the transmitter for applying an output signal of the transmitter to the receiver;
   a switch connected between the coupler and the receiver for selectively applying an output signal of the coupler to the receiver, and feeding back the output signal of the coupler to a Digital Signal Processing (DSP) device;
   the Digital Signal Processing (DSP) device connected to the receiver for feeding back the output signal of the coupler through the receiver, generating a calibration signal using the feed-back output signal of the coupler according to a DC offset cancellation algorithm and applying the calibration signal to an adder included in the transmitter;
   the adder connected to the DSP device for adding a baseband transmission signal from the transmitter and the calibration signal
   a modulator for modulating a signal from the adder; and
   a transmitter amplifier for amplifying the modulated signal.

2. The device according to claim 1, wherein the DSP device estimates a carrier feed-through component caused by the transmitter using a DC offset caused by the receiver and an original form of a signal sampled in the transmitter, and regards the estimated value as an error caused by incompleteness of the transmitter.

3. The device according to claim 2, further comprising:
   a receiver amplifier for amplifying a transmission signal received from the coupler; and
   a modulator for modulating the amplified signal from the receiver amplifier and outputting the modulated signal to the DSP device.

* * * * *